United States Patent
Kim et al.

(10) Patent No.: US 10,194,222 B2
(45) Date of Patent: Jan. 29, 2019

(54) PACKET-BASED OPTICAL SIGNAL SWITCHING CONTROL METHOD AND APPARATUS

(71) Applicant: ELECTRONICS AND TELECOMMUNICATIONS RESEARCH INSTITUTE, Daejeon (KR)

(72) Inventors: Daeub Kim, Daejeon (KR); Jongtae Song, Daejeon (KR); Sun Me Kim, Daejeon (KR); Chansung Park, Sejong-si (KR); Tae Whan Yoo, Daejeon (KR); Ji Wook Youn, Daejeon (KR); Kyeong-Eun Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/623,558

(22) Filed: Jun. 15, 2017

(65) Prior Publication Data

US 2018/0109857 A1    Apr. 19, 2018

(30) Foreign Application Priority Data

Oct. 17, 2016  (KR) .................. 10-2016-0134646
Feb. 8, 2017  (KR) .................. 10-2017-0017448

(51) Int. Cl.
*H04B 10/00* (2013.01)
*H04Q 11/00* (2006.01)
*H04L 12/863* (2013.01)

(52) U.S. Cl.
CPC ...... *H04Q 11/0066* (2013.01); *H04L 47/6255* (2013.01); *H04Q 11/0003* (2013.01); *H04Q 2011/0016* (2013.01); *H04Q 2011/0032* (2013.01); *H04Q 2011/0033* (2013.01);
(Continued)

(58) Field of Classification Search
USPC ..................................... 398/45–57
See application file for complete search history.

(56) References Cited

U.S. PATENT DOCUMENTS

| | | |
|---|---|---|
| 6,512,616 B1 | 1/2003 | Nishihara |
| 7,120,358 B2 | 10/2006 | Okada et al. |
| 8,837,942 B2 | 9/2014 | Kang |

(Continued)

FOREIGN PATENT DOCUMENTS

| | | |
|---|---|---|
| KR | 10-0759167 B1 | 9/2007 |
| KR | 10-1586950 B1 | 1/2016 |

*Primary Examiner* — Agustin Bello
(74) *Attorney, Agent, or Firm* — LRK Patent Law Firm

(57) ABSTRACT

An optical switching control method and apparatus. The method includes generating an optical switching path corresponding to a destination node of service traffic flowing from an external service network, generating an optical frame corresponding to the generated optical switching path, transmitting, to a control server, a request message for requesting an allocation of a time slot to transmit the generated optical frame, generating an optical signal having a predetermined wavelength to transmit the optical frame in response to an admission message being received as a result of admission with respect to the request message, and transferring the optical frame to the destination node based on the optical switching path using the generated optical signal.

12 Claims, 13 Drawing Sheets

(52) U.S. Cl.
CPC ............... *H04Q 2011/0073* (2013.01); *H04Q 2011/0086* (2013.01)

(56) References Cited

U.S. PATENT DOCUMENTS

| | | |
|---|---|---|
| 2010/0135661 A1 | 6/2010 | Youn et al. |
| 2016/0044393 A1* | 2/2016 | Graves ............... H04Q 11/0003 398/51 |
| 2016/0080102 A1* | 3/2016 | Fang ..................... H04J 14/005 398/74 |
| 2018/0109857 A1* | 4/2018 | Kim ................... H04Q 11/0066 |

* cited by examiner

FIG. 12

| Preamble | | | | |
|---|---|---|---|---|
| | | | | SFD |
| DA | | | | |
| DA | | | SA | |
| SA | | | | |
| TPID(0x8100) | | User Priority | 0 | VID |
| Ethernet length | | Version/ type | | TS ID |
| BP | S-PFWI ID | (D-VOQ1 info) | | (D-VOQ2 info) |
| (D-VOQ3 info) | (D-VOQ4 info) | (D-VOQ5 info) | | (D-VOQ6 info) |
| (D-VOQ7 info) | (D-VOQ8 info) | | | |
| ⋮ | | | | |
| | | (D-VOQ353 info) | | (D-VOQ354 info) |
| (D-VOQ355 info) | (D-VOQ356 info) | (D-VOQ357 info) | | (D-VOQ358 info) |
| (D-VOQ359 info) | (D-VOQ360 info) | CRC | | |
| CRC | | | | |

FIG. 13

| Preamble | | |
|---|---|---|
| | | SFD |
| DA | | |
| DA | SA | |
| SA | | |
| TPID(0x8100) | User Priority | 0 | VID |
| Ethernet length | Version/type | TS ID |
| S-PFWI 1 (D-PFWI, PFI Info) | S-PFWI 2 (D-PFWI, PFI Info) |
| | S-PFWI 3 (D-PFWI, PFI Info) | |
| S-PFWI 4 (D-PFWI, PFI Info) | S-PFWI 5 (D-PFWI, PFI Info) |
| | S-PFWI 6 (D-PFWI, PFI Info) | |
| S-PFWI 7 (D-PFWI, PFI Info) | S-PFWI 8 (D-PFWI, PFI Info) |
| ⋮ | |
| S-PFWI 41 (D-PFWI, PFI Info) | S-PFWI 42 (D-PFWI, PFI Info) |
| | S-PFWI 43 (D-PFWI, PFI Info) | |
| S-PFWI 44 (D-PFWI, PFI Info) | S-PFWI 45 (D-PFWI, PFI Info) |
| | | CRC |
| 157 CRC 137 | | |

PACKET-BASED OPTICAL SIGNAL SWITCHING CONTROL METHOD AND APPARATUS

CROSS-REFERENCE TO RELATED APPLICATION(S)

This application claims the priority benefit of Korean Patent Application No. 10-2016-0134646, filed on Oct. 17, 2016 in the Korean Intellectual Property Office, and Korean Patent Application No. 10-2017-0017448, filed on Feb. 8, 2017 in the Korean Intellectual Property Office, the disclosures of which are incorporated herein by reference for all purposes.

BACKGROUND

1. Field

One or more example embodiments relate to a packet-based optical signal switching control apparatus and method and, more particularly, to a method and an apparatus for converting data traffic reaching an entrance portion of an optical signal network into an optical signal suitable for an optical signal network, generating an optical signal for each destination of the optical signal network to transfer the data traffic to a destination based on technology for changing an optical switching path in response to a change in input and output port of the optical signal and a wavelength of the optical signal, and controlling an optical signal switching path.

2. Description of Related Art

Recently, with developments of circuit switching technology such as an optical transport network (OTN), synchronous optical networking (SDH), and a synchronous optical network (SONET) and packet switching technology such as Ethernet, multi-protocol label switching (MPLS), and Internet protocol (IP) in data communication, a speed and a capacity an optical network has also been increasing.

In the optical network that is rapidly increasing in speed and capacity, electric switch-based signal switch is reaching its limit. Accordingly, there is a desire for optical network technology for transmitting and switching an optical signal generated in a start node of an optical network directly to a destination node without need to electrically convert the optical signal.

SUMMARY

An aspect provides a method and an apparatus for converting data traffic reaching an entrance portion of an optical signal network into an optical signal suitable for an optical signal network, generating an optical signal for each destination of the optical signal network to transfer the data traffic to a destination based on technology for changing an optical switching path in response to a change in input and output port of the optical signal and a wavelength of the optical signal, and controlling an optical signal switching path.

According to an aspect, there is provided an optical switching control method performed by a data plane of a packet-based optical signal network, the method including generating an optical switching path corresponding to a destination node of service traffic flowing from an external service network, generating an optical frame corresponding to the generated optical switching path, transmitting, to a control server, a request message for requesting an allocation of a time slot and the optical switching path to transmit the generated optical frame, generating an optical signal having a predetermined wavelength to transmit the optical frame in response to an admission message being received as a result of admission with respect to the request message, setting an optical switching path for transmitting the optical signal by designating an input and output port and a switching port for switching the optical signal, and transferring the optical frame to the destination node based on the set optical switching path and the time slot.

The transferring may include transferring the optical frame using an arrayed waveguide grating router (AWGR) that changes an optical switching path based on a wavelength of an optical signal.

When another request message for requesting an allocation of the time slot is received from an entrance node in a process of transmitting the request message for requesting the allocation of the time slot and a use of the optical switching path, the transmitting may include sequentially transmitting the request message using a delay logic of a shift register.

The request message for requesting the allocation of the time slot and the optical switching path may include an identification (ID) of a requested time slot, a destination node ID, an optical switching path ID, a busy situation of a service port and an optical switching path, information on an entrance node transmitting the request message, virtual output queue (VOQ) information of the entrance node for each destination.

According to another aspect, there is also provided an optical switching control method performed by a control server of a packet-based optical signal network, the method including receiving a request message for requesting an allocation of a time slot and a use of an optical switching path from a control client of an entrance node, performing a scheduling function based on the received request message and determining to allow a predetermined optical switching path to be allocated to a predetermined time slot, and transferring an admission message as a result of admission for the request message, to the control client of the entrance node.

The request message for requesting the allocation of the time slot and the use of the optical switching path may include an ID of a requested time slot, a destination node ID, an optical switching path ID, a busy situation of a service port and an optical switching path, information on an entrance node transmitting the request message, VOQ information of the entrance node for each destination.

The receiving may include grouping request messages received from a plurality of entrance nodes and processing the grouped request messages.

According to still another aspect, there is also provided an optical switching control apparatus including a data plane configured to transfer service traffic input to an entrance node of a packet-based optical network, to a destination node using an optical signal, and a control server configured to control an optical switching on a plurality of optical switching paths between the entrance node and the destination node of the data plane.

The data plane may include an optical frame transmitter configured to manage an optical switching path corresponding to the destination node of the service traffic and generate an optical frame corresponding to the optical switching path, an optical variable transmitter configured to generate an optical signal having a predetermined wavelength to transmit the generated optical frame to the destination node, an arrayed waveguide grating router configured to transmit the optical signal having the predetermined wavelength to the destination node, an optical transmitter configured to receive the optical signal having the predetermined wavelength and convert the optical signal into an electric signal, and an optical frame receiver configured to extract the service traffic from an optical frame included in the received optical signal.

The optical switching path may include information on the wavelength of the optical signal, a time slot in which the optical signal is transmitted, and an optical signal input and output port from the entrance node to the destination node.

The control server may include a control interface manager configured to receive a request message for requesting an allocation of a time slot and a use of a corresponding optical switching path from a control client of the entrance node and transfer an admission message as a result of admission for the request message to a control client of the entrance node, and a scheduler configured to perform a scheduling function based on the request message received by the control interface manager such that a predetermined optical switching path is allocated to a predetermined time slot.

When a request message for requesting an allocation of a time slot and a use of a corresponding optical switching path is received from another entrance node in a process of transmitting the request message, the control client of the entrance node may be configured to sequentially transmit the request message using a delay logic of a shift register.

The request message for requesting the allocation of the time slot includes an ID) of a requested time slot, a destination node ID, an optical switching path ID, a busy situation of a service port and an optical switching path, information on an entrance node transmitting the request message, VOQ information of the entrance node for each destination.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 12 is a diagram illustrating an example of a request message using an Ethernet frame according to an example embodiment; and FIG. 13 is a diagram illustrating an example of an admission message using an Ethernet frame according to an example embodiment.

DETAILED DESCRIPTION

Figure 1:
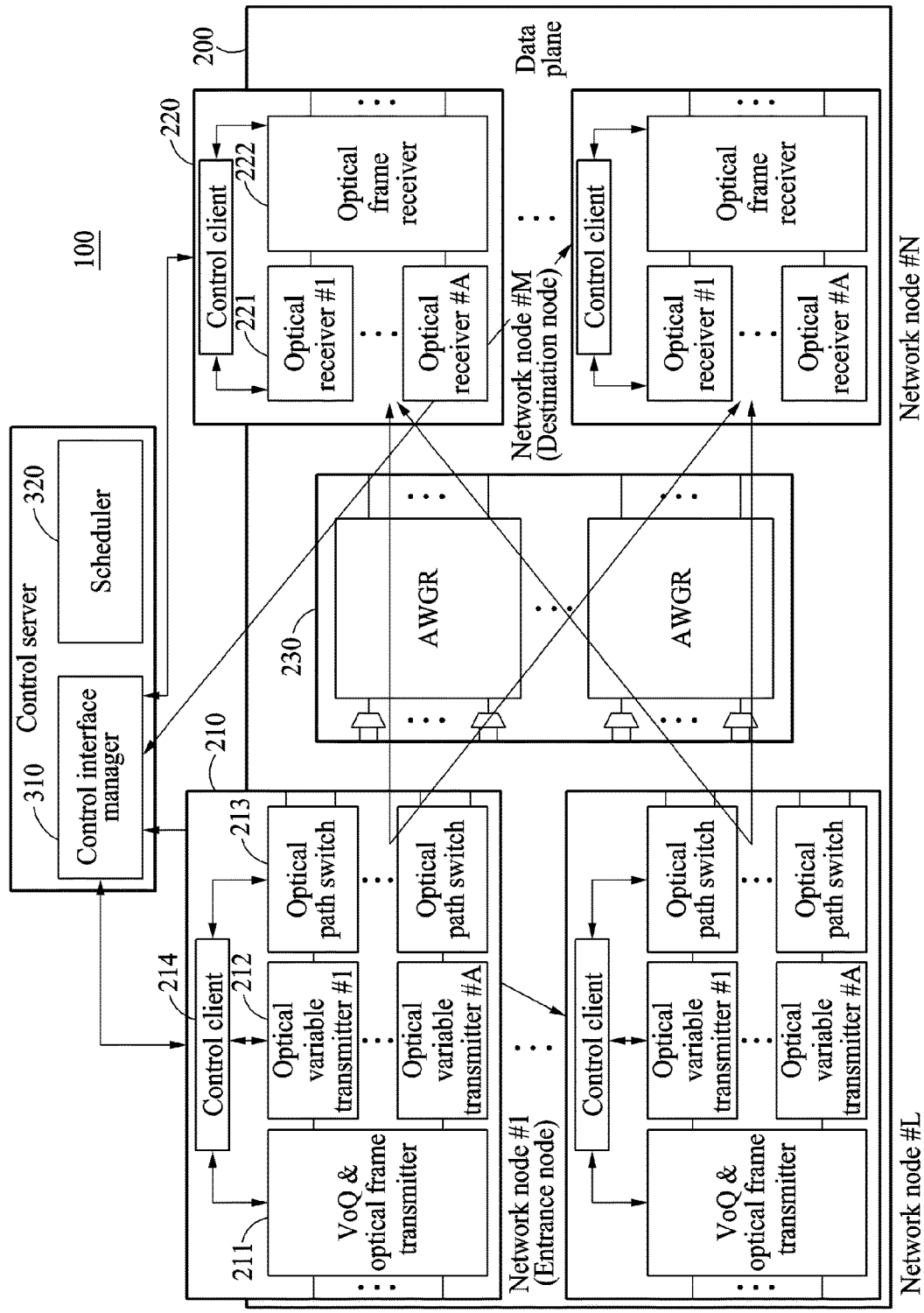
FIG. 1 is a diagram illustrating a packet-based optical signal network according to an example embodiment.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The following specific structural or functional descriptions are examples to merely describe embodiments, and various alterations and modifications may be made to the examples. Here, the examples are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, reference will now be made in detail to examples with reference to the accompanying drawings, wherein like reference numerals refer to like elements throughout.

FIG. 1 is a diagram illustrating a packet-based optical signal network according to an example embodiment.

An optical signal network 100 may transmit service traffic flowing from an external service network to an entrance node 210 to a destination node using technology for changing an optical switching path, for example, a photonic switch path (PSP), based on a wavelength of an optical signal and an input and output port of an optical element. The optical signal network 100 may include a data plane 200 configured to transmit service traffic to a destination node 220 corresponding to a destination along an optical switching path, a control server 300 configured to control a change in optical switching path, and a control client 214 distributed to the entrance node 210 and the destination node 220.

The data plane 200 may include optical elements provided on a path along which the service traffic is input and output in the optical signal network 100. Also, the data plane 200 may indicate an overall physical path for transmitting the service traffic from an input port of the entrance node 210 in which the service traffic is input to an output port of the destination node 220 to which the service traffic is output.

The data plane 200 may include a plurality of entrance nodes including the entrance node 210, a plurality of destination nodes including the destination node 220, and an arrayed waveguide grating router (AWGR) 230 located between the entrance node 210 and the destination node 220 to change an optical switching path based on a wavelength of an optical signal. A plurality of optical switching paths may be present between the entrance node 210 and the destination node 220. Each of the optical switching paths may include attribution information associated with the wavelength of the optical signal, a time slot in which the optical signal is transferred, an optical signal input and output port for all physical optical elements present between the entrance node 210 and the destination node 220.

Specifically, the entrance node 210 may include an optical frame transmitter 211, an optical variable transmitter 212, and an optical path switch 213. The optical frame transmitter 211 may apply the aforementioned control to the service traffic input through an external service network so as to determine the optical switching path that is an optical signal transmission path on the data plane 200. The optical frame transmitter 211 may generate an optical frame, for example, a photonic frame (PF) corresponding to each optical switching path and store the optical frame in a virtual output queue (VOQ) that is a memory for storing the optical frame. In this example, the VOQ may store optical frames by classifying the optical frames for each of the optical switching paths to the same destination.

To transmit the optical frames stored in the VOQ for each of the optical switching paths to the same destination, the optical variable transmitter 212 may generate an optical signal having a predetermined wavelength based on a time slot and an input and output port of optical elements. That is, the optical frame generated for a predetermined optical switching path may be transmitted to the destination node 220 in a predetermined time slot using an optical signal having one predetermined wavelength. Thereafter, the optical variable transmitter 212 may transfer the optical signal having the predetermined wavelength to the optical path switch 213 positioned at a tail end of the entrance node 210

The optical path switch 213 may perform switching of the optical signal received by the optical variable transmitter 212 during the time slot corresponding to the optical signal so as to be transmitted to an output port designated based on the optical switching path corresponding to the optical signal.

The AWGR 230 may transfer the optical signal received through the optical path switch 213 to an output port that is optically determined based on a wavelength. In this example, the output port may be previously determined based on the wavelength of the received optical signal with respect to the AWGR 230.

The destination node 220 may include an optical receiver 221 and an optical frame receiver 222. The optical receiver 221 may convert the optical signal received through the AWGR 230 into an electric signal and transfer the electric signal to the optical frame receiver 222.

The optical frame receiver 222 may extract service traffic appropriate for the external service network from an optical frame of the electric signal into which the optical signal is converted by the optical receiver 221. Also, the optical frame receiver 222 may transfer the extracted service traffic to an interface corresponding to the external service network.

The optical frame transmitter 211, the optical variable transmitter 212, the optical path switch 213, the optical receiver 221, and the optical frame receiver 222 may be components or elements to be electrically controlled. In this example, although FIG. 1 illustrates that the optical frame transmitter 211, the optical variable transmitter 212, and the optical path switch 213 are mounted on the entrance node 210 and the optical receiver 221 and the optical frame receiver 222 are mounted on the destination node 220, the aforementioned elements may also be physically separated to be controlled. Also, the optical path switch 213 and the AWGR 230 may be arranged in various forms through an ordinal change and overlap to achieve various optical switching path configurations.

As illustrated in FIG. 1, each of the plurality of entrance nodes may include a plurality of optical variable transmitters and each of the plurality of destination nodes may include a plurality of optical receivers on the data plane 200 of the optical signal network 100. the plurality of entrance nodes and the plurality of destination nodes may be connected to the external service network or a top-of-rack (ToR) switch through a plurality of Ethernet ports at a service ingress/egress point.

Depending on examples, a network configuring element of the external service network may be any type of network configuring element having a communicating function, for example, a processor, a storage, and a server other than the ToR switch. Also, a plurality of physical ports may be provided for each service ingress/egress point of the entrance nodes and the destination nodes.

As such, based on the packet-based optical signal network in which the plurality of entrance nodes are connected to the plurality of destination nodes using the plurality of optical variable transmitters and the plurality of optical receivers, each of the entrance nodes may transmit optical signals to the destination node 220 simultaneously, thereby communicating using an increased bandwidth.

The data plane 200 of the optical signal network 100 may include N network nodes including a combination of the entrance node 210 and the destination node 220, and each of the network nodes may be managed and controlled through a time synchronization.

The control server 300 may provide a control signal to change the optical switching path of the optical signal transferred on the data plane 200. The control server 300 may include a control interface manager 310 and a frame scheduler 320. The VOQ of the entrance node 210 may store the optical frames generated for each of the optical switching path with respect to the same destination by classifying the optical frames in units of time slot. In this example, to transmit the optical frame stored in the VOQ to the destination node 220, the control client included in the entrance node 210 may transmit a request message for requesting an allocation of a time slot and an optical switching path corresponding to the optical frame, to the control interface manager 310 in the control server 300.

The control interface manager 310 may form an optical switching path managing table for each time slot of the optical signal network 100 based on the request message received from the control client 214 included in the entrance node 210 such that the frame scheduler 320 starts scheduling in response to requests of control clients.

The frame scheduler 320 may perform scheduling for a valid request of the optical switching path managing table for each time slot using request messages received by the control interface manager 310, thereby controlling a predetermined optical frame to be transmitted along a predetermined optical switching path during a single time slot.

Figure 2:
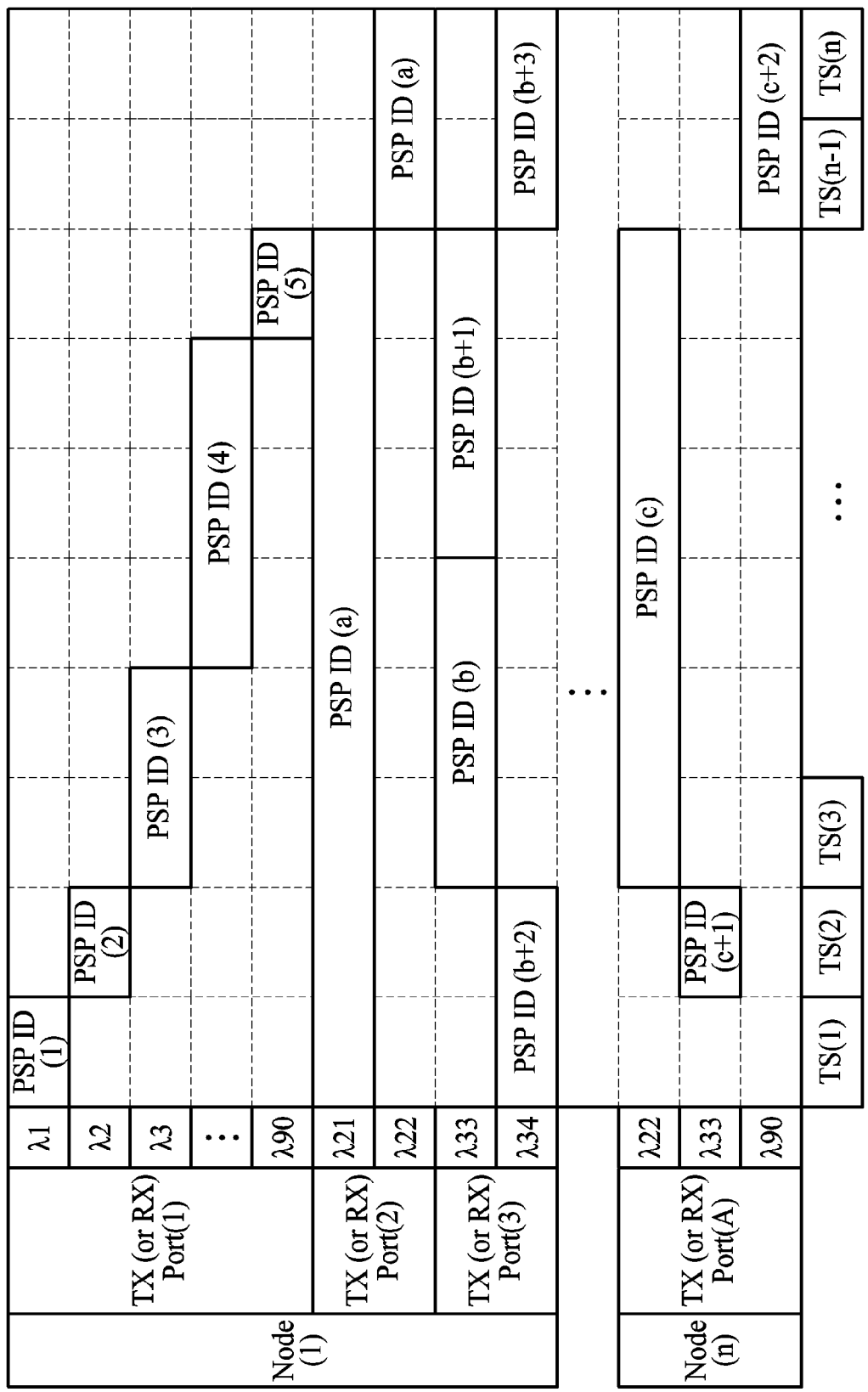
FIG. 2 illustrates a table representing an example of constructing and managing an optical switching path based on a wavelength and a time slot for each optical signal input and output port of an entrance node and a destination node according to an example embodiment.

FIG. 2 illustrates a table representing an example of constructing and managing an optical switching path based on a wavelength and a time slot for each optical signal input and output port of an entrance node and a destination node according to an example embodiment.

The destination node 220 corresponding to a destination of the optical signal network 100 may be operated based on a time slot, and may receive an optical signal having a predetermined wavelength in a predetermined time slot. Thus, a network node having a structure in which an optical signal is transmitted and received at a single physical input and output port using a plurality of optical switching paths may need to accurately manage the time slot for transmission and reception of the optical signal. That is, each network node may manage a VOQ for each destination and thus, transmit an optical frame stored in a predetermined VOQ along a corresponding optical switching path in a predetermined time slot. In an example of FIG. 2, in nodes 1 through n of the optical signal network 100, an optical switching path corresponding to an optical signal having a determined wavelength during a predetermined time slot may be allocated.

For example, the node 1 may include a plurality of transmission ports or a plurality of reception ports. Specifically, a transmission port 1 may allocate an optical switching path corresponding to PSD ID 1 with respect to an optical signal having a wavelength λ1 during a time slot TS 1, and allocate an optical switching path corresponding to PSD ID 2 with respect to an optical signal having a wavelength λ2 during a time slot TS 2.

As shown in the table of FIG. 2, an optical switching path corresponding to an optical signal having a predetermined wavelength may be allocated to each transmission port or reception port during a single time slot, and an optical switching path of an optical signal having a wavelength other than the predetermined wavelength may not be allocated.

Figure 3:
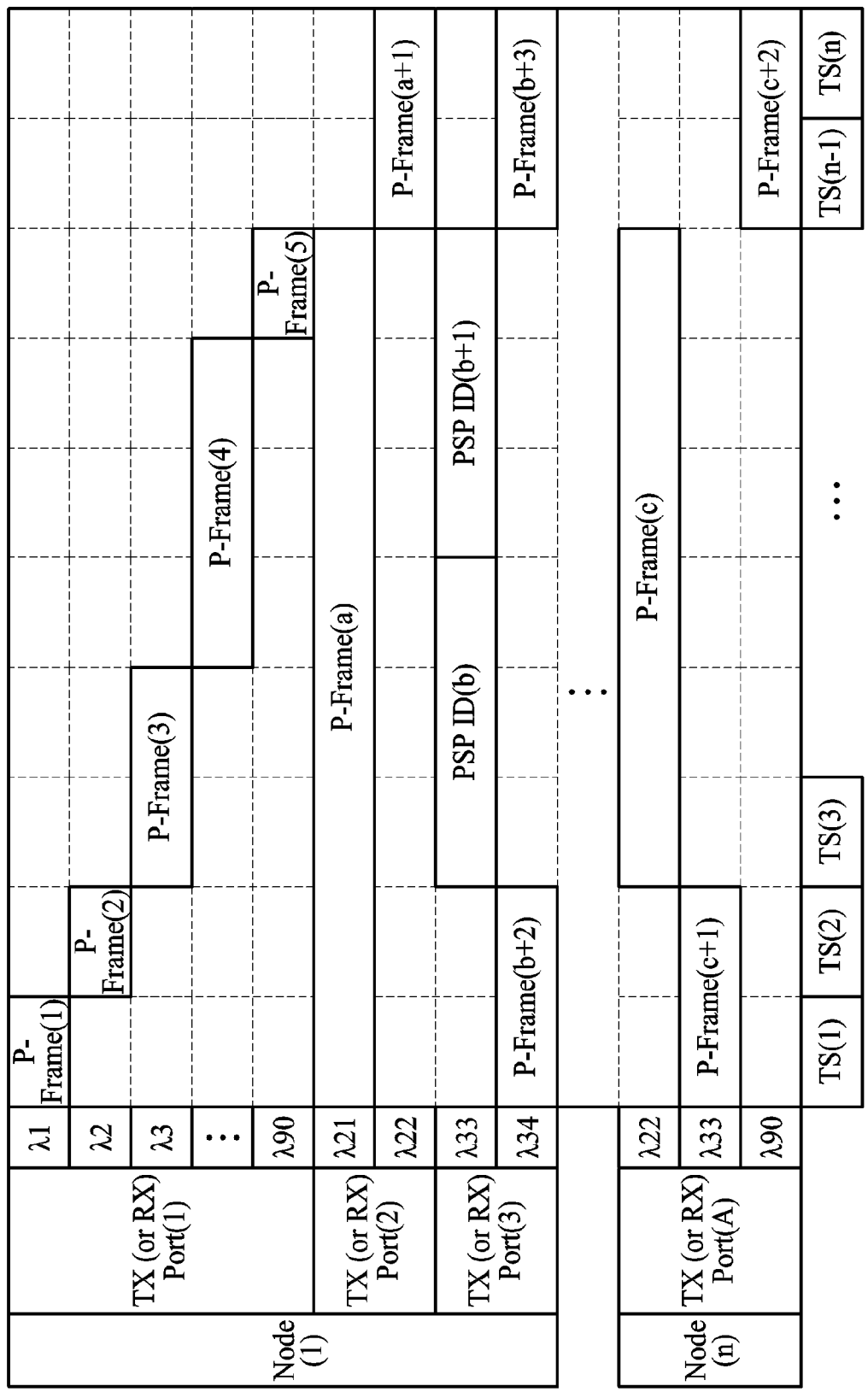
FIG. 3 is a diagram illustrating an example in which an optical frame having a predetermined wavelength is transmitted to a destination node along a corresponding optical switching path on a data plane in a predetermined time slot according to an example embodiment.

FIG. 3 is a diagram illustrating an example in which an optical frame having a predetermined wavelength is transmitted to a destination node along a corresponding optical switching path on a data plane in a predetermined time slot according to an example embodiment.

Referring to FIG. 3, in a network node of the optical signal network 100, an optical frame may be transmitted along an optical switching path corresponding to an optical signal having a wavelength set for a predetermined time slot.

As illustrated in FIG. 3, an optical frame corresponding to an optical signal having a predetermined wavelength may be allocated to each transmission port or reception port during a single time slot, and an optical frame of an optical signal having a wavelength other than the predetermined wavelength may not be allocated.

Figure 4:
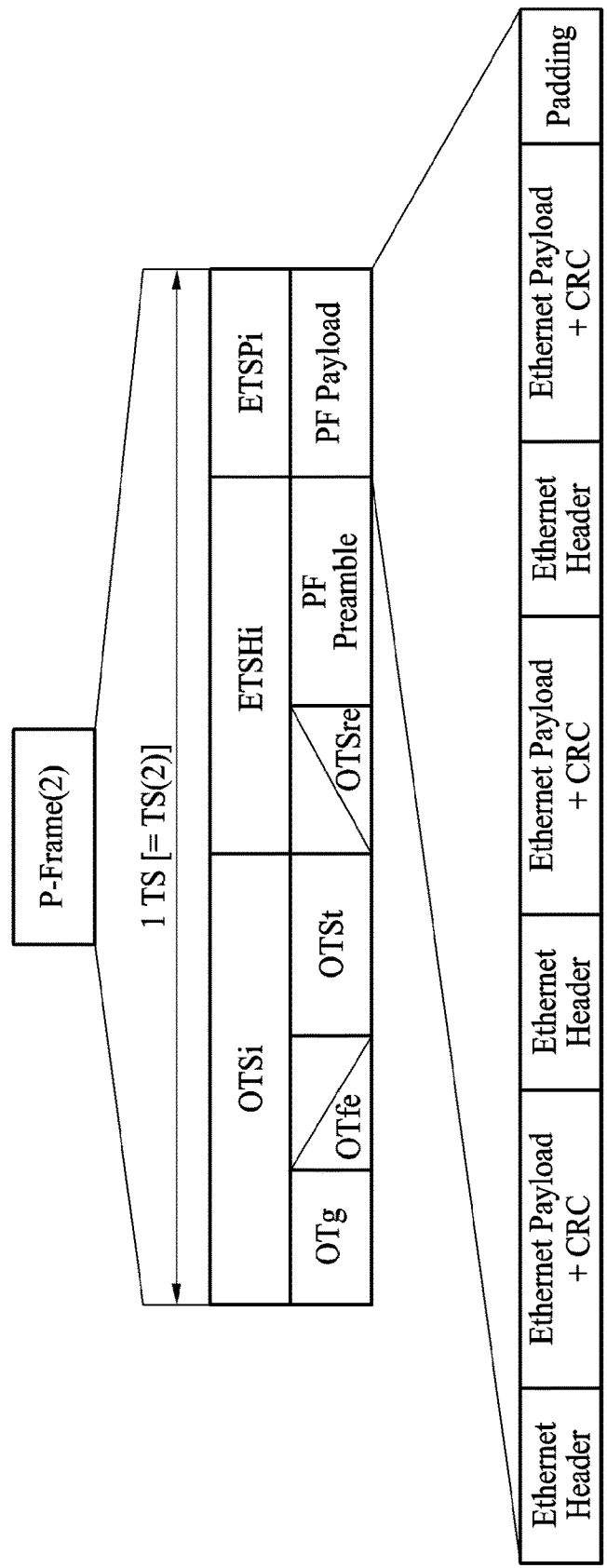
FIG. 4 is a diagram illustrating an example of optical frames, each transferring an Ethernet frame in a single time slot based on service traffic according to an example embodiment.

FIG. 4 is a diagram illustrating an example of optical frames, each transferring an Ethernet frame in a single time slot based on service traffic according to an example embodiment.

A single time slot may include an optical switching interval (OTSi) and an electric processing interval (ETSi). In this example, each of the optical switching interval and the electrical processing interval may be calculated as a multiple of minimum management time information (ti). The optical switching interval may be a time not to be used for data transmission. Also, the optical switching interval may include an optical rising edge time (OTSre) corresponding to a normal time for generating an optical signal in a process of optical switching, an optical falling edge time (OTfe) corresponding to an optical signal fading time, and an interval of compensating for a difference in distance between optical switching paths (OTg).

The electric processing interval may be an interval to be used for actual data transmission. In the electric processing interval, 0 and 1 of a bit may be electrically determined. Specifically, the electric processing interval may include a an optical frame header, for example, a PF header time (ETSHi), a preamble, and a payload time (ETSPi) to transmit an optical frame. For example, the optical frame header may include the OTSre and the preamble. Also, the optical frame may include optical frame control and attribute information to perform in-band signaling for controlling network nodes.

Figure 5:
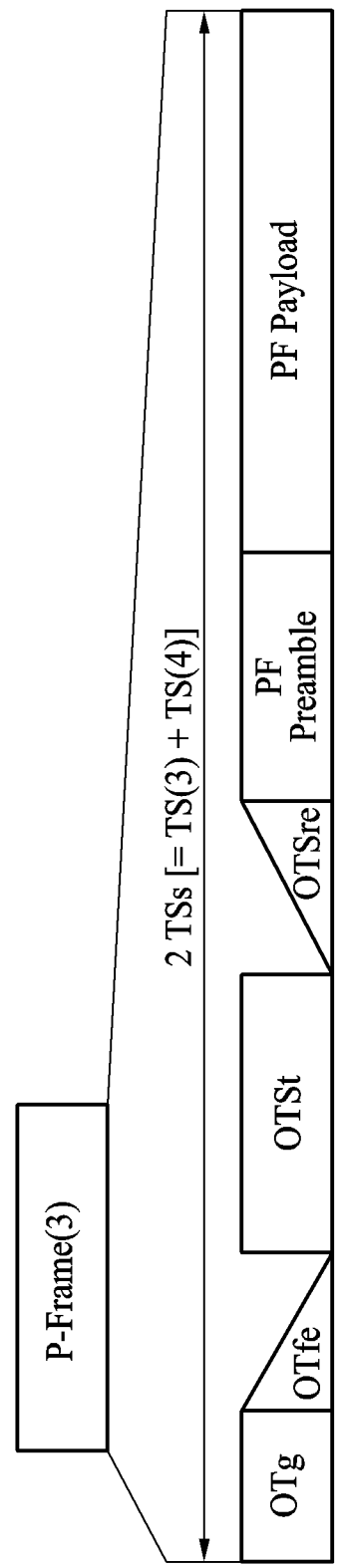
FIG. 5 is a diagram illustrating an example of optical frames, each transferring an Ethernet frame in at least two time slots based on service traffic according to an example embodiment.

FIG. 5 is a diagram illustrating an example of optical frames, each transferring an Ethernet frame in at least two time slots based on service traffic according to an example embodiment.

When at least two time slots are consecutively admitted for a single optical switching path, an optical frame transmitted to a single destination may be transmitted by fully using a payload in an optical header for each of the time slot without optical switching. This may allow the entrance node 210 of the optical signal network 100 to transmit the optical frame by changing a length thereof. An OTS and an ETSH for a time slot, starting from a second ordinal position may not be used when the transmission is performed based on a consecutive wavelength but may be used for actual data transmission. That is, when at least two time slots are consecutively admitted for a single optical switching path, a time slot other than a first time slot may be filled with a PF payload (ETSP).

A minimum transmission unit of an optical frame transmitted by each of the network nodes may be transmitted during a predetermined time slot. In this instance, the OTS may need to be considered and valid service traffic may not be transmitted during the OTS.

A number of time slots managed in the single entrance node 210 or destination node 220 may be at least a total number of nodes, N when each node performs transmission to a node of itself or N−1 when each node performs transmission to a node of others.

When each node performs transmission to a node of others, and when only a single input and output port is present in a single node, N*(N−1) optical switching paths may be present in the packet-based optical signal network 100. In this example, when A input and output ports are present in a single node, A*N(N−1) optical switching paths may be present in the packet-based optical signal network 100.

Figure 6:
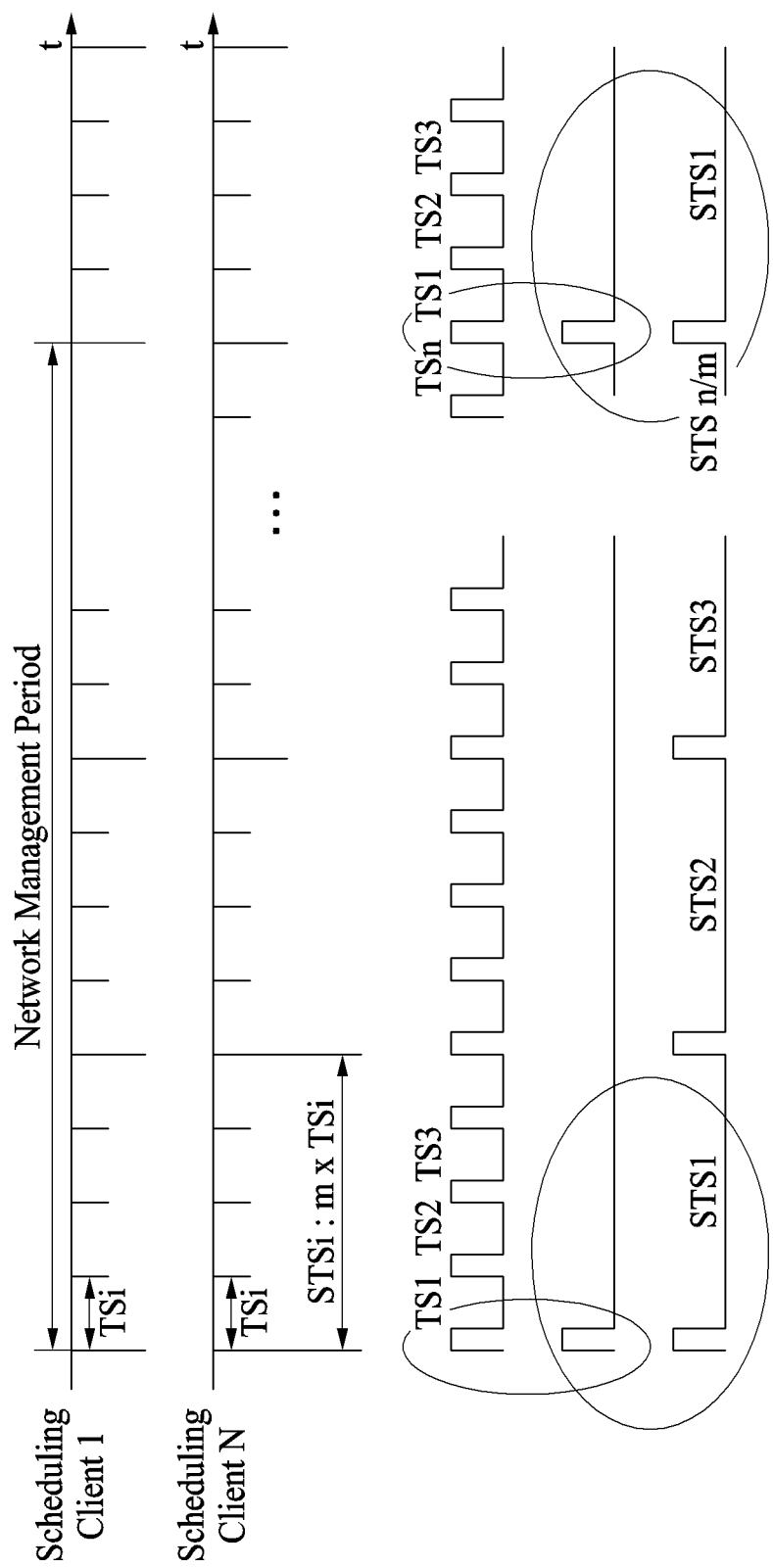
FIG. 6 is a diagram illustrating time information based on a time slot to be managed for request and admission for the time slot and transmission of an optical signal or an optical frame in each network node according to an example embodiment.

FIG. 6 is a diagram illustrating time information based on a time slot to be managed for request and admission for the time slot and transmission of an optical signal or an optical frame in each network node according to an example embodiment.

N network nodes scheduled according to an example embodiment, for example, scheduling clients may manage time information in units of network management period (NMP), scalable time slot (STS), and single time slot (TSi). The single time slot may be of a physical time associated with a clock unit and allocated to transmit and manage an optical frame for each VOQ of an optical switching path.

The scalable time slot may be restricted based on a maximum VOQ storage capacity of each optical switching path and may be configured based on a multiple of a time slot (=m*TS, m>1). As the number of time slots included in a single scalable time slot increases, the total number of network nodes to be managed may be reduced proportionally.

The network management period may indicate a scheduling period related to an optical frame control on an optical signal network, time information associated with a time slot, and the number of network nodes of a packet-based optical signal network. The network management period may be managed based on a positive integer multiple of a time slot. Also, in terms of a size of switch related to the number of input and output network nodes, when switching structures of 360*360, 180*180, and 90*90 are possible, input and output ports of the optical signal may each have periods of 360, 180, and 90 time slots.

An optical switching path table with respect to all network nodes in the packet-based optical signal network may be managed in a control server. Also, an optical switching path table attribute may be statically set through a control channel. The optical switching path table for each of the network nodes may also be managed in the corresponding network node. Each of the optical switching paths may be managed in conjunction with a VOQ. In the packet-based optical signal network, the optical switching path in each of the network nodes and the control server may be statically set by incorporating an attribute of the optical switching path based on a physical network configuration.

Figure 7:
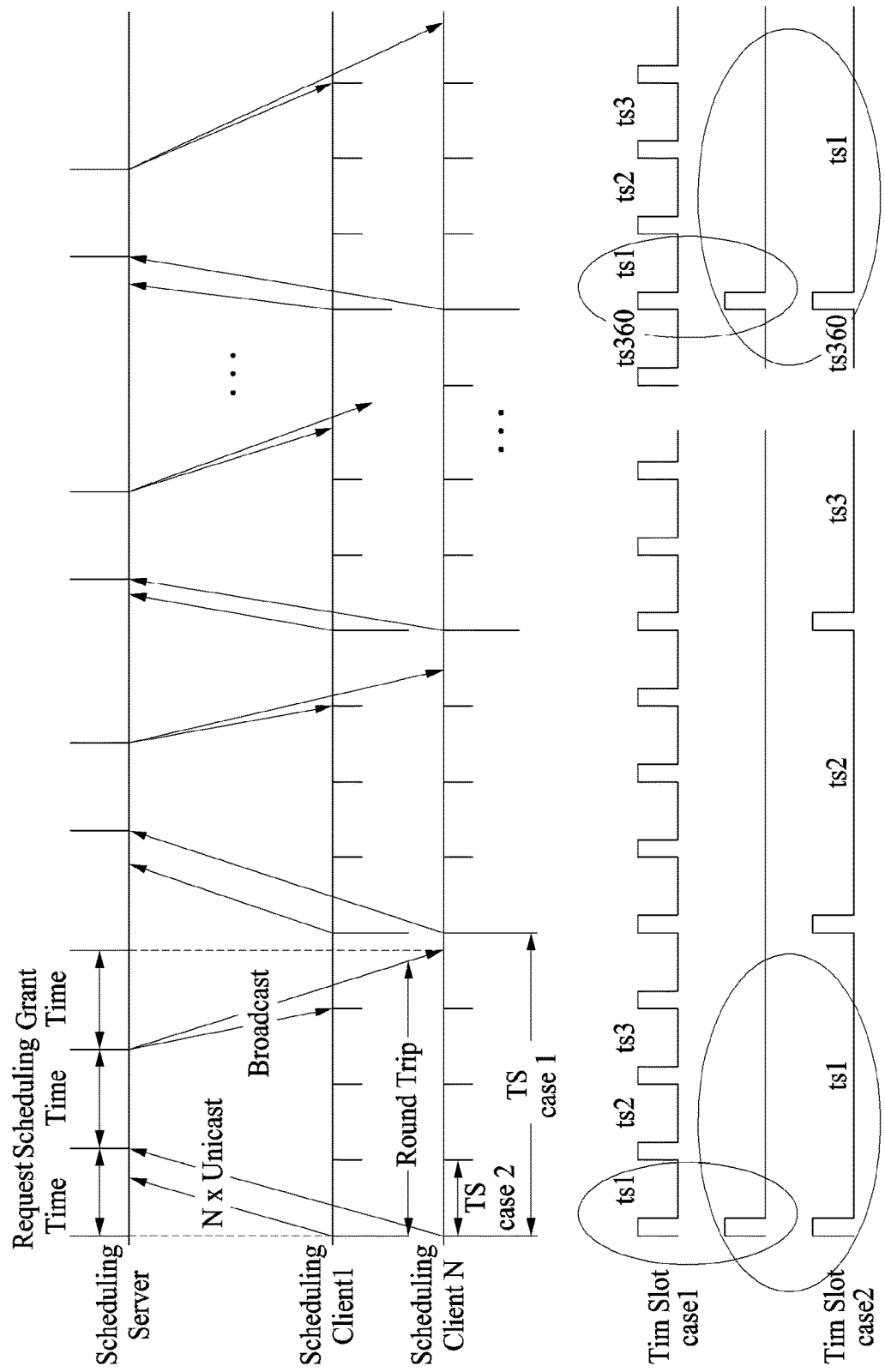
FIG. 7 is a diagram illustrating a control rule in terms of a time according to an example embodiment.

FIG. 7 is a diagram illustrating a control rule in terms of a time according to an example embodiment.

In the packet-based optical signal network 100, when statistical multiplexing transmission of an optical signal or an optical frame and a competition for transmissions between entrance nodes and the same destination node occur, a scheduling for dynamic transmission of an optical frame for each time slot may be performed based on a control rule as follows. In response to a presence of an optical frame to be transmitted from the optical frame transmitter 211 of each of network nodes included in the optical signal network 100, the control client 214 included in the entrance node 210 may transmit a request message for an allocation of a time slot and a use of the corresponding optical switching path to the control server 300.

The control server 300 may execute a scheduling function of the frame scheduler 320 based on the request message received in the entrance node 210 and determine a use optical switching path such that an optical signal having a single wavelength is transmitted to a single time slot through a predetermined optical signal input and output port.

To permit an optical frame transmission on the determined optical switching path, the control server 300 may transmit an admission message, for example, Grant, to all of the entrance nodes such that each of the entrance nodes having transmitted the request messages verifies whether the request of the corresponding entrance node is admitted.

Also, the entrance node 210 may transmit the optical frame by using a predetermined wavelength during a predetermined time slot through a predetermined optical signal input and output port of the data plane 200 along the optical switching path determined based on the admission message.

Specifically, in terms of time, the control rule may be managed based on a request message transfer time (Request time) between the control server 300 and the control client 214, a scheduling processing time (Scheduling time) in the control server 300, and a roundtrip time including an admission message transfer time (Grant time).

The control client 214 may transmit the request message including VOQ information of the entrance node 210 to the control server 300 at a starting point of each time slot. When an admission message for each time slot is received, the entrance node 210 for which the corresponding time slot is admitted may transmit an optical frame in the time slot.

In this example, the roundtrip time of the control rule may be variable based on a structure of the optical signal network 100. For example, a time period of the time slot may need to be managed in Time Slot Case 1 in which the time period is less than the roundtrip time. Also, a time period of the time slot may need to be managed in Time Slot Case 2 in which the time period is greater than the roundtrip time.

In Time Slot Case 2, the entrance node 210 having received the admission message may transmit the optical frame during a subsequent time slot. In Time Slot Case 1, the admission message may need to include admitted time slot information to be provided to the entrance node 210. Also, the entrance node 210 having received the admission message may transmit the optical frame during a predetermined time slot instead of the subsequent time slot. In this example, a single admission message may include information indicating admissions of a plurality of time slots.

Figure 8:
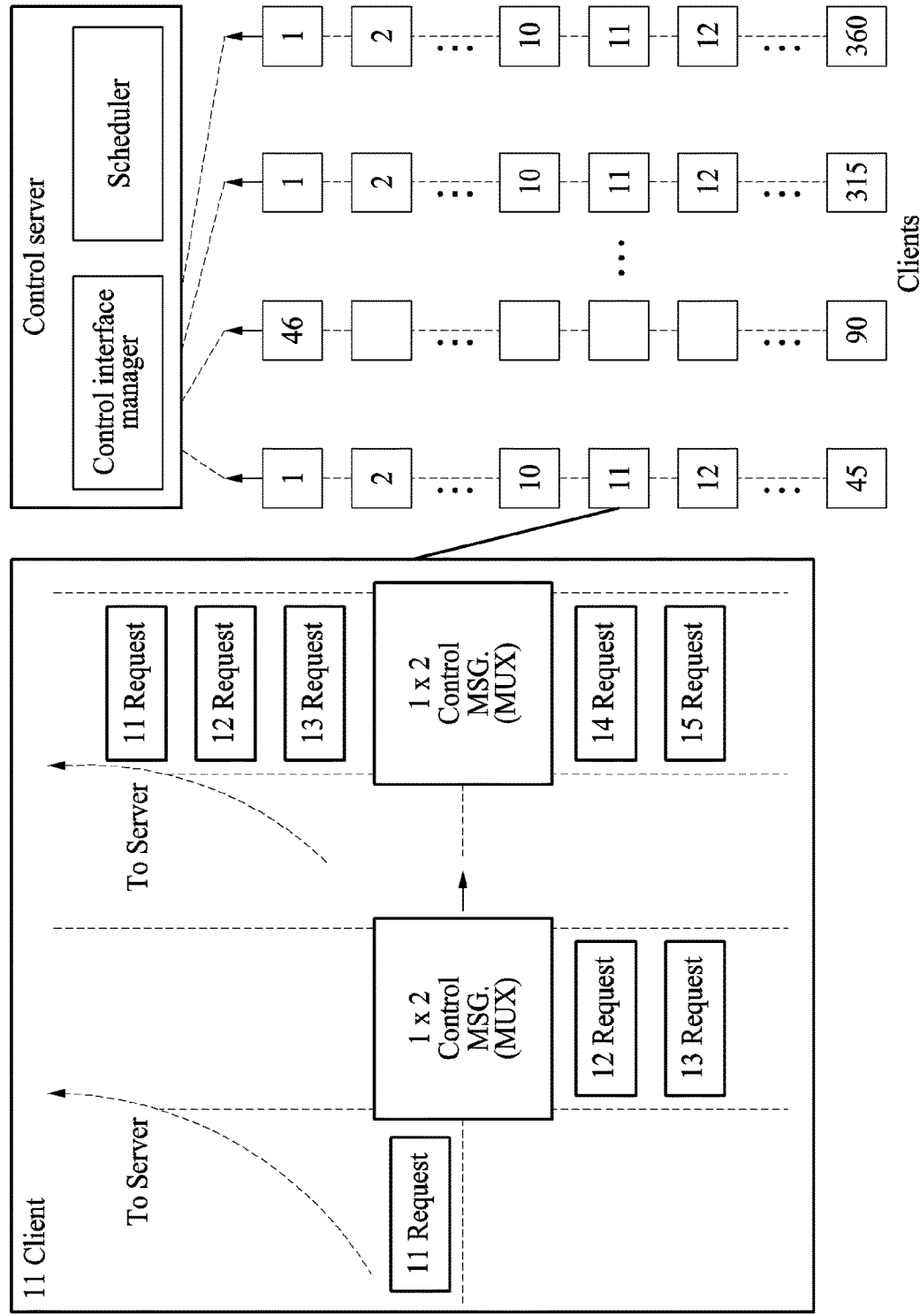
FIG. 8 is a diagram illustrating an example of an upstream control network for transferring a request message according to an example embodiment.

FIG. 8 is a diagram illustrating an example of an upstream control network for transferring a request message according to an example embodiment.

The control interface manager 310 of the control server 300 may collect request messages from a plurality of entrance nodes included in the packet-based optical signal network 100, and may transfer and share the request messages such that the frame scheduler 320 effectively performs the scheduling. Also, the control interface manager 310 may provide a protocol frame processing function for quickly transferring an admission result of the scheduling completed by the frame scheduler 320 to each of the entrance nodes through an admission message. In this example, the control interface manager 310 may form a time slot allocation request table for the optical switching path by processing the received request messages and transfer a scheduling start point to the frame scheduler 320.

The control interface manager 310 may group the plurality of entrance nodes into a plurality of groups or zones and set a request message and an admission message to be transmitted and received for each of the groups to reduce a transfer time of request messages and admission messages of the entrance nodes and efficiently process the request messages and admission messages. Through this, each of the messages may be transmit and received on a group-by-group basis.

As the foregoing, the network nodes may be formed into groups dependently on a physical form of the optical signal network 100. Also, the network nodes may be logically formed into groups to achieve an efficiency of management. The physical form may determine the control client 214 or a plurality of network nodes connected to a single port of the control server 300.

In an example of FIG. 8, when 360 network nodes are provided, the 360 network nodes may be divided into groups, each including 45 network nodes. Thus, total 8 groups may be managed.

The uplink control network may be in a daisy-chain form. In the uplink control network. each network node or control client having a single input port and output port for a request message may transmit the request message to a server direction output port and transfer the request message received in the input port to the server direction output port.

That is, the control client 214 of each network node may have a message multiplexer to transmit a local request message in a predetermined time of the corresponding time slot. Thus, the control client 214 may perform upward transmission of the request message, for example, a transit request message received from another network node without collision.

Figure 9:
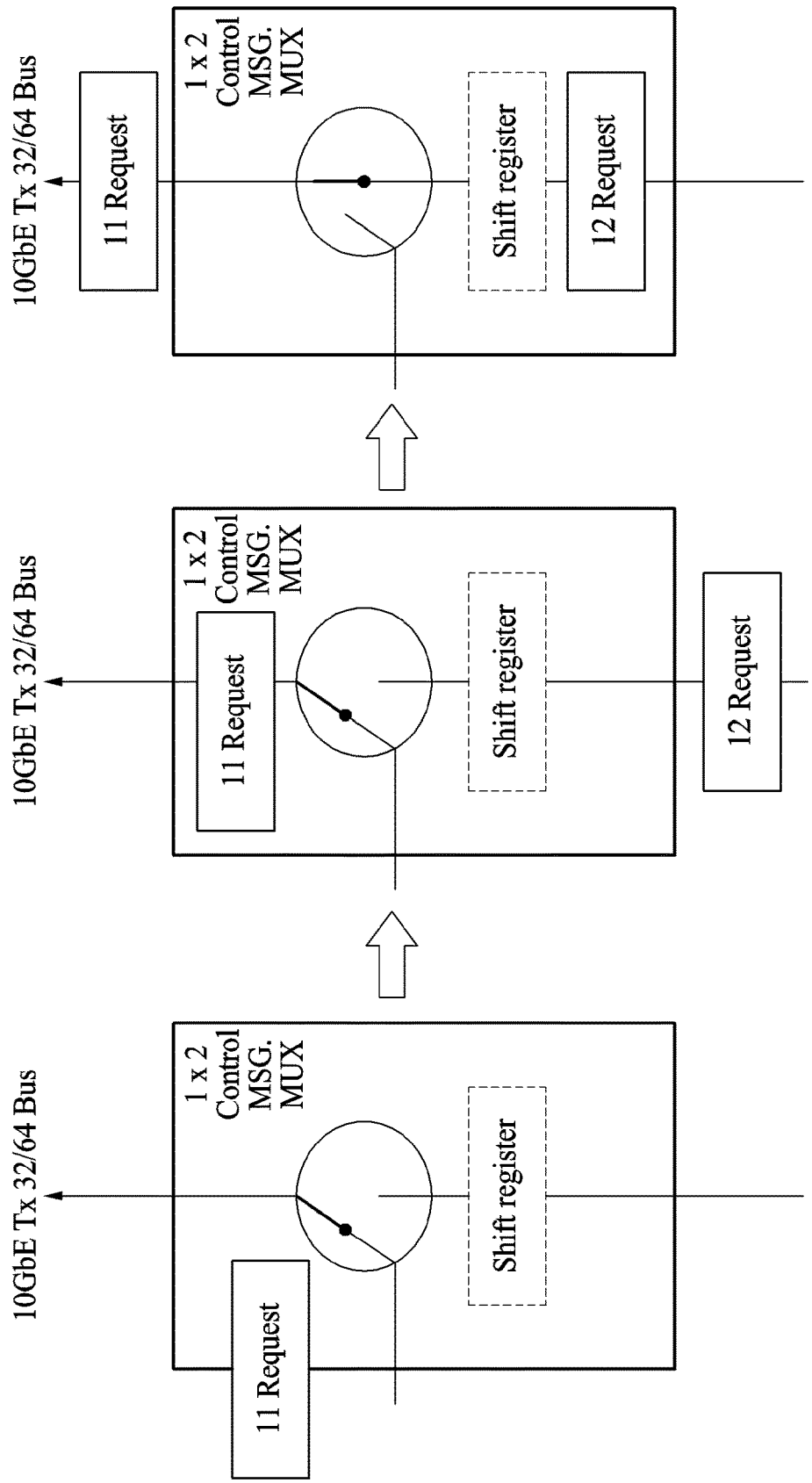
FIG. 9 is a diagram illustrating an operation of a message multiplexer according to an example embodiment.

FIG. 9 is a diagram illustrating an operation of a message multiplexer according to an example embodiment.

As illustrated in a left portion of FIG. 9, the control client 214 included in a network node may operate in a default mode to transmit a local request message in a request time based on a synchronization logic.

As illustrated in a middle portion of FIG. 9, when a transit request message is received from another network node in a process of transmitting the local request message, the control client 214 may operate in a delay logic by a shift register or another physical logics such that sequential transmission is performed.

For example, when a transit request message is received from another network node in a process of transmitting the local request message, the control client 214 may complete the transmission of the local request message using a multiplexer, and then sequentially transmit the transit request message by performing a switching operation for the transit request message as illustrated in a right portion of FIG. 9.

In this example, when a collision between the local request message and the transit request message does not occur, the control client 214 may not execute the delay logic, and thus a speed of transferring a request message in a group may increase.

In addition, for error management of the uplink control network, a link between network nodes at the lowermost end of a group may be physically connected and logically blocked as necessary. Also, it is possible to perform a protection switching to avoid the error based on various types of ring protection switching schemes that bypass a node in which the error may occur by using a physical bypass link.

Figure 10:
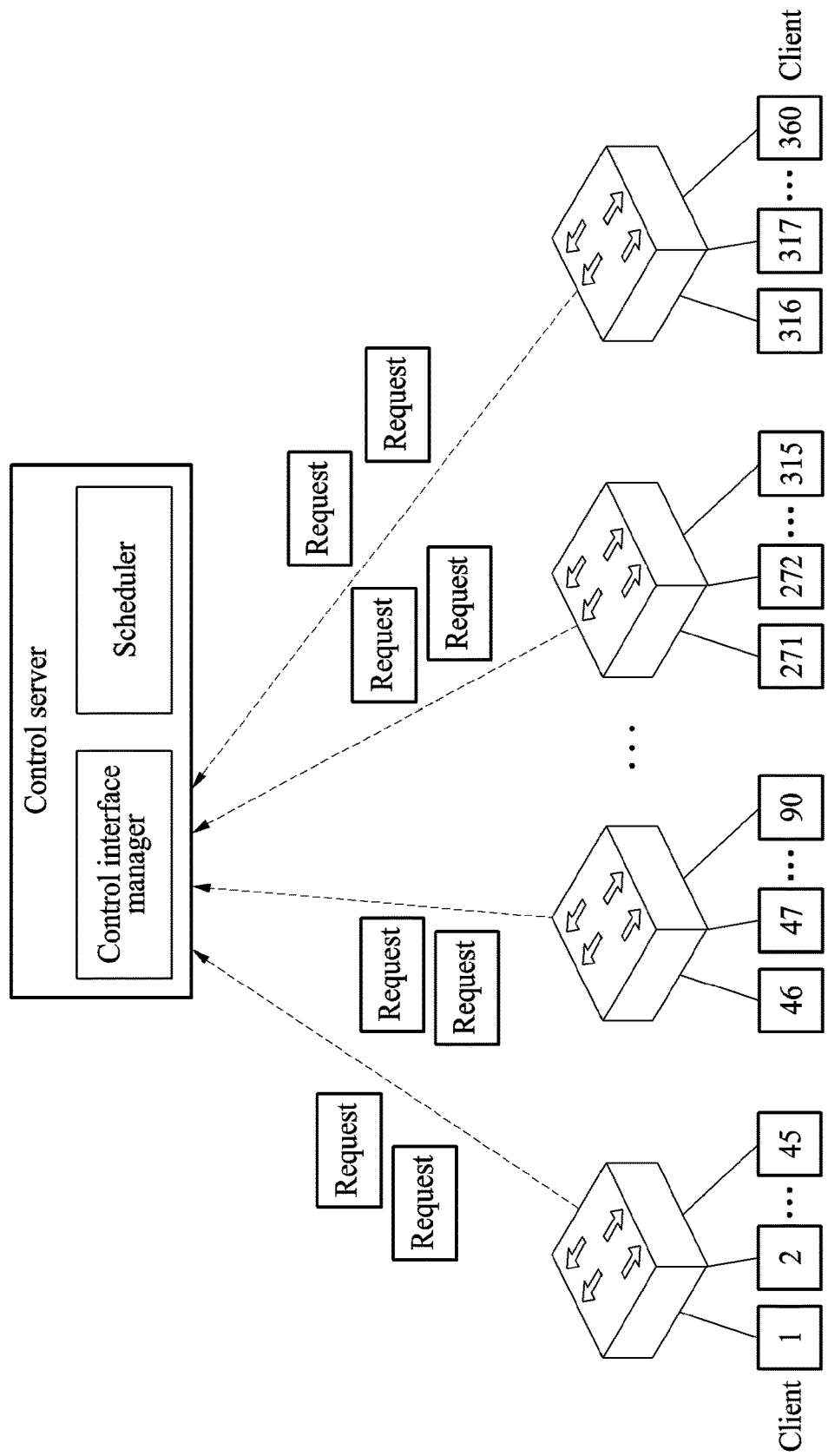
FIG. 10 is a diagram illustrating another example of an upstream control network for transferring a request message according to an example embodiment.

FIG. 10 is a diagram illustrating another example of an upstream control network for transferring a request message according to an example embodiment.

As illustrated in FIG. 10, when 360 network nodes are provided, the 360 network nodes may be divided into groups, each including 45 network nodes. Thus, total 8 groups may be managed.

An upward control network may be provided in a form of tree. In such upward control network, a single output port included in each network node or control client for each group may be connected through a multiplexer having a single output port in a direction to a server and a plurality of input ports. Through this, an in-group request message may be multiplexed to be transferred to the control server 300. A basic principle of a multiplexer may be as described with reference to the multiplexer of FIG. 10. In this example, according to an increase in the number of input ports, a storing memory with a size sufficient to temporarily store a plurality of messages may be required so as to transmit a message to an output port based on a delay logic without collision. In this example, a multiplexer may use a switch as further discussed in an example of FIG. 11.

Figure 11:
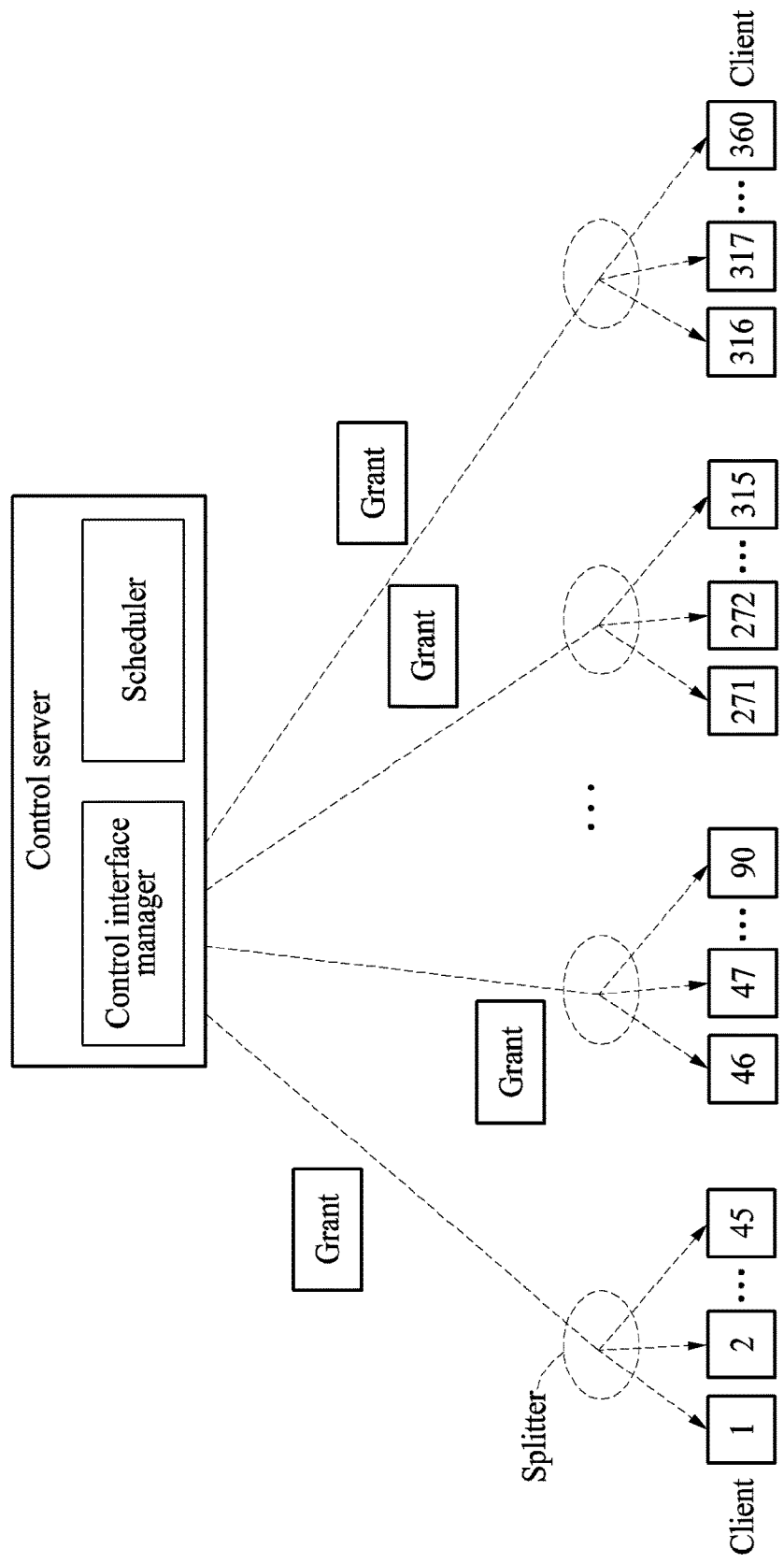
FIG. 11 is a diagram illustrating a physical form of a downstream control network of a control interface for a packet-based optical signal network according to an example embodiment.

FIG. 11 is a diagram illustrating a physical form of a downstream control network of a control interface for a packet-based optical signal network according to an example embodiment.

As illustrated in FIG. 11, when 360 network nodes are provided, the 360 network nodes may be divided into groups, each including 45 network nodes. Thus, total 8 groups may be managed.

Also, an optical splitter disposed between the control server 300 and the control client 214 to provide an optical signal branch may be used so as to transfer an admission message, for example, Grant, from the control server 300 to all control clients in a group using the same control signal without additional delay.

FIG. 12 is a diagram illustrating an example of a request message using an Ethernet frame according to an example embodiment.

A request message may include information requested from each network node. The requested information may include an requested time slot identification (TS ID), a busy situation (BP) of a service port and an optical switching path, information on an entrance node transmitting the request message, VOQ information of the entrance node for each destination. Although not shown, the request message may also include an optical switching path ID. The optical switching path ID may be obtained based on entrance node information and destination VOQ information sequentially arranged based on destinations.

FIG. 12 illustrates 360 network nodes, each including VOQ information associated with 360 destinations in order to transmit optical frames along 360 optical switching paths to 360 destination nodes. The VOQ information may include, for example, an amount of data of an optical frame to be transmitted and a maximum delay of an optical frame that has not been transmitted. In this example, an appropriate length of each piece of information may be used as necessary.

FIG. 13 is a diagram illustrating an example of an admission message using an Ethernet frame according to an example embodiment.

An admission message may include information to be admitted with respect to network nodes differing for each group. Admission information may include information on an optical switching path available for each network node on a frame field allocated for each entrance node, for example, S-PFWI and an admitted time slot, for example, TS ID and information on the destination node 220 associated with the optical switching path.

For example, in response to an admission for a use of a time slot and whether the corresponding time slot is actually to be used among requests for a plurality of optical switching paths sent from a predetermined network entrance node to a predetermined time slot in order to transmit an optical frame, the admission information may include attribute information of an allocated optical switching path. In this example, a length of each piece of information may be determined as necessary. Also, depending on examples, the information may include an entrance node ID node value, and an admitted destination node or optical switching path. The aforementioned admission and request messages may also be transmitted with other communication messages as well as the Ethernet.

The present disclosure relates to a control management network used to generate service traffic flowing into a packet-based optical signal network, into an optical frame to be transferred for each destination. Specifically, there is provided a method to originate control management attributes of the packet-based optical signal network and acquire a control network for quickly transmitting and receiving the control management attributes between a control server and a network node without delaying. To this end, a physical control network configuration may be provided to ensure a quick optical signal networking operation. In the present disclosure, an optical network control time may be reduced to be within a few microseconds (μs) when compared to a typical optical network control time of at least a few seconds. Accordingly, it is possible to perform not only a statistically set circuit connection in an optical switch but also a packet-based optical signal processing capable of dynamical scheduling.

According to an aspect, it is possible to convert data traffic reaching an entrance portion of an optical signal network into an optical signal suitable for an optical signal network, generate an optical signal for each destination of the optical signal network to transfer the data traffic to a destination based on technology for changing an optical switching path in response to a change in input and output port of the optical signal and a wavelength of the optical signal, and control an optical signal switching path.

According to another aspect, it is also possible to reduce electric energy assumption and alleviate a data transfer delay in a network based on control technology that enables an optical switching to be performed without need to convert an optical signal into an electric signal between an entrance node and a destination node.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical switching control method performed by a data plane of a packet-based optical signal network, the optical switching control method comprising:
    generating optical switching paths to a destination node of service traffic flowing from an external service network to an entrance node;
    generating optical frames corresponding to the optical switching paths;
    transmitting, from the entrance node to a control server, each of request messages for requesting allocation of one of time slots and use of one of the optical switching paths to transmit each of the optical frames;
    generating each of optical signals having a predetermined one of wavelengths corresponding to each of the optical frames to transmit each of the optical frames in response to each of admission messages being received as a result of admission with respect to each of the request messages;
    setting one of the optical switching paths for transmitting each of the optical signals by designating one of a plurality of output (input) ports included in the entrance (destination) node for switching each of the optical signals; and
    transferring each of the optical frames to the destination node based on the set one of the optical switching paths and the allocated one of the time slots.

2. The optical switching control method of claim 1, wherein the transferring includes transferring each of the optical frames using an arrayed waveguide grating router (AWGR) that changes an optical switching path based on a wavelength of an optical signal.

3. The optical switching control method of claim 1, wherein when another request message for requesting allocation of the one of the time slots is received from another entrance node in a process of transmitting one of the request messages for requesting the allocation of one of the time slots and the use of one of the optical switching paths, the transmitting includes sequentially transmitting the one of the request messages and the other request message using a delay logic of a shift register.

4. The optical switching control method of claim 1, wherein each of the request messages for requesting the allocation of one of the time slots and the use of one of the optical switching paths includes a requested time slot identification (ID), a destination node ID, an optical switching path ID, a busy situation of a service port and an optical switching path, information on the entrance node transmitting the request message, virtual output queue (VOQ) information of the entrance node for each destination.

5. An optical switching control method performed by a control server of a packet-based optical signal network, the optical switching control method comprising:
    receiving each of request messages for requesting allocation of one of time slots and use of one of optical switching paths to a destination node from a control client of an entrance node;
    performing a scheduling function based on each of the received request messages to allocate a predetermined one of the optical switching paths to a predetermined one of the time slots; and
    transferring to the control client of the entrance node each of admission messages as a result of admission with respect to each of the request messages.

6. The optical switching control method of claim 5, wherein each of the request messages for requesting the allocation of one of the time slots and the use of one of the optical switching paths includes a requested time slot identification (ID), a destination node ID, an optical switching path ID, a busy situation of a service port and an optical switching path, information on the entrance node transmitting the request message, virtual output queue (VOQ) information of the entrance node for each destination.

7. The optical switching control method of claim 5, wherein the receiving includes receiving a plurality o f request messages for requesting allocation of time slots and use of optical switching paths from a plurality of entrance nodes, grouping the plurality of request messages, and processing the grouped request messages.

8. An optical switching control apparatus comprising:
    a data plane configured to transfer service traffic input to an entrance node of a packet-based optical network to a destination node using optical signals; and
    a control server configured to control optical switching on a plurality of optical switching paths between the entrance node and the destination node of the data plan,
    wherein the data plane includes:
    an optical frame transmitter configured to generate optical frames corresponding to the optical switching paths to the destination node of the service traffic;
    an optical variable transmitter configured to generate each of optical signals having a predetermined one of wavelengths corresponding to each of the optical frames to transmit each of the optical frames to the destination node in each of allocated time slots;
    an arrayed waveguide grating router (AWGR) configured to transmit each of the optical signals having the predetermined one of wavelengths to the destination node;
    an optical receiver configured to receive each of the optical signals having the predetermined one of wavelengths and to convert each of the optical signals into an electric signal; and
    an optical frame receiver configured to extract the service traffic from one of the optical frames included in each of the received optical signals.

9. The optical switching control apparatus of claim 8, wherein each of the optical switching paths includes information on the wavelength of the optical signal, the time slot in which the optical signal is transmitted, and an input-output port of the optical signal from the entrance node to the destination node, wherein the input-output port is one of a plurality of output (input) ports included in the entrance (destination) node.

10. The optical switching control apparatus of claim 8, wherein the control server includes:
    a control interface manager configured to receive each of request messages for requesting allocation of one of time slots and use of one of the optical switching paths from a control client of the entrance node and to transfer each of admission messages as a result of admission with respect to each of the request messages to the control client of the entrance node; and
    a scheduler configured to perform a scheduling function based on each of the request messages received by the control interface manager such that a predetermined one of the optical switching paths is allocated to a predetermined one of the time slots.

11. The optical switching control apparatus of claim 10, wherein when another request message for requesting an allocation of the one of the time slots and use of the one of the optical switching paths is received from another entrance node in a process of transmitting one of the request messages, the control client of the entrance node is configured to sequentially transmit the one of the request messages and the other request message using a delay logic of a shift register.

12. The optical switching control, apparatus of claim 10, wherein each of the request messages for requesting the allocation of one of the time slots includes a requested time slot identification (ID), a destination node ID, an optical switching path ID, a busy situation of a service port and an optical switching path, information on the entrance node transmitting the request message, virtual output queue (VOQ) information of the entrance node for each destination.

\* \* \* \* \*